(12) United States Patent
Schuller (10) Patent No.: US 10,059,195 B2
(45) Date of Patent: Aug. 28, 2018

(54) MOTOR VEHICLE OPERATING FLUID CONTAINER MADE OF THERMOPLASTIC

(71) Applicant: KAUTEX TEXTRON GMBH & CO. KG, Bonn (DE)

(72) Inventor: Markus Schuller, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 15/523,314

(22) PCT Filed: Oct. 23, 2015

(86) PCT No.: PCT/EP2015/074611
§ 371 (c)(1),
(2) Date: Apr. 28, 2017

(87) PCT Pub. No.: WO2016/066545
PCT Pub. Date: May 6, 2016

(65) Prior Publication Data
US 2017/0313176 A1    Nov. 2, 2017

(30) Foreign Application Priority Data

Oct. 31, 2014   (DE) .................. 10 2014 222 286

(51) Int. Cl.
*A47J 27/00* (2006.01)
*B60K 15/035* (2006.01)
(Continued)

(52) U.S. Cl.
CPC ...... *B60K 15/035* (2013.01); *B60K 15/03177* (2013.01); *H05B 3/146* (2013.01);
(Continued)

(58) Field of Classification Search
None
See application file for complete search history.

(56) References Cited

U.S. PATENT DOCUMENTS 3,744,513 A * 7/1973 Leitenberger ........... B60T 11/26
137/255
4,090,668 A * 5/1978 Kochenour ............. B60S 1/481
15/250.04

(Continued)

FOREIGN PATENT DOCUMENTS

DE        201 10 548 U1     2/2002
DE    10 2012 108273 A1     3/2014
(Continued)

OTHER PUBLICATIONS

Examination Report dated Oct. 16, 2017 in related European Patent Application No. 15784696.5, filed Oct. 23, 2015.
(Continued)

*Primary Examiner* — Thor Campbell
(74) *Attorney, Agent, or Firm* — Wiley Rein LLP (57) ABSTRACT

A motor vehicle operating fluid container is made of thermoplastic. The container is composed of two shells forming a substantially closed hollow body. A first shell forms an upper base of the container, and a second shell forms a lower base of the container. The container includes at least one line which is designed as an integral part of a container wall over at least one sub-length, where the line is designed as a channel which runs in the container wall over said sub-length. The channel has an open trough-shaped profiled cross-section which forms a part of the line cross-section, and the channel is closed by at least one cover which complements the trough-shaped profiled cross-section so as to form a closed cross-section.

13 Claims, 5 Drawing Sheets

(51) Int. Cl.
*B60K 15/03* (2006.01)
*H05B 3/14* (2006.01)
*B60S 1/48* (2006.01)

(52) U.S. Cl.
CPC ............... *B60K 2015/03523* (2013.01); *B60K 2015/03528* (2013.01); *B60K 2015/03566* (2013.01); *B60S 1/48* (2013.01); *H05B 2203/021* (2013.01)

(56) References Cited

U.S. PATENT DOCUMENTS

| | | | | |
|---|---|---|---|---|
| 4,355,512 A | * | 10/1982 | Kubota | B60T 17/225 60/534 |
| 4,514,980 A | * | 5/1985 | Ishiwata | B60T 17/225 60/534 |
| 4,775,856 A | * | 10/1988 | Ochs | B60T 11/26 200/84 R |
| 4,805,668 A | * | 2/1989 | Genter | B60T 11/26 137/558 |
| 4,841,107 A | * | 6/1989 | Tandler | B60T 17/225 200/84 C |
| 5,398,839 A | * | 3/1995 | Kleyn | B60K 15/03177 220/4.14 |
| 6,984,000 B2 | * | 1/2006 | Fraisse | B60T 8/4081 188/345 |
| 7,261,382 B2 | * | 8/2007 | Hayashi | B60T 11/22 303/1 |
| 7,448,211 B2 | * | 11/2008 | Hayashi | B60T 11/26 60/534 |
| 7,588,194 B2 | * | 9/2009 | Shank | B05B 9/002 239/130 |
| 7,779,862 B2 | * | 8/2010 | Sanderson | B62D 5/062 137/573 |
| 7,912,360 B2 | * | 3/2011 | Gschwind | B60K 15/00 392/302 |
| 8,047,451 B2 | * | 11/2011 | McNaughton | B60S 1/487 137/599.14 |
| 8,561,917 B2 | * | 10/2013 | Arkasjevski | B05B 9/002 239/128 |
| 8,960,227 B2 | * | 2/2015 | Smith | F15B 21/044 137/574 |
| 2002/0020705 A1 | | 2/2002 | Vorenkamp et al. | |
| 2003/0141381 A1 | * | 7/2003 | Bissonnette | B05B 1/24 239/132 |
| 2007/0116599 A1 | * | 5/2007 | Walters | G01N 35/00663 422/64 |
| 2008/0289917 A1 | * | 11/2008 | L'Aot | B60T 11/26 188/152 |
| 2010/0095937 A1 | | 4/2010 | Hudak et al. | |
| 2011/0218286 A1 | | 11/2011 | Drebes et al. | |
| 2013/0192702 A1 | * | 8/2013 | Chiasson | B29C 49/00 137/565.17 |
| 2015/0291020 A1 | * | 10/2015 | Ley | B29C 49/04 220/562 |

FOREIGN PATENT DOCUMENTS

| | | |
|---|---|---|
| DE | 102012108273 A1 | 3/2014 |
| EP | 1 213 173 A2 | 6/2002 |
| EP | 1213173 A2 | 6/2002 |
| EP | 1 745 971 A2 | 1/2007 |
| EP | 1745971 A2 | 1/2007 |
| WO | 2014147138 A1 | 9/2014 |

OTHER PUBLICATIONS

PCT Notification of Transmittal of Translation of the International Preliminary Report on Patentability (Chapter I or II), dated Apr. 5, 2017, in related International Patent Application No. PCT/EP2015/074611, filed Oct. 23, 2015.
International Search Report and Written Opinion dated Feb. 12, 2016, for International Patent Application No. PCT/EP2015/074611.
Office Action, dated Dec. 18, 2017, issued in related Chinese Patent Application No. 201580071005.6.

* cited by examiner

MOTOR VEHICLE OPERATING FLUID CONTAINER MADE OF THERMOPLASTIC

RELATED APPLICATIONS

This application is a § 371 National Stage Application of PCT/EP2015/074611, filed Oct. 23, 2015, which claims priority benefit of German Patent Application No. 10 2014 222 286.9, filed Oct. 31, 2014, which applications are incorporated entirely by reference herein for all purposes

FIELD

The invention relates to an operating fluid container for a motor vehicle made of thermoplastic material, wherein the container is composed of two shells so as to form a substantially closed hollow body.

SUMMARY AND DESCRIPTION OF RELATED ART

For the purposes of the present invention, an operating fluid container for a motor vehicle is to be understood as meaning, for example, a fuel container, a wiper washing container for windscreen cleaning fluid, or an additive container for receiving a fuel additive or for receiving an additive for exhaust-gas purification. By way of example, the container can be formed as a container for receiving an aqueous urea solution for the purpose of selective catalytic exhaust-gas denitrogenization.

In principle, it is known to form operating fluid containers of this type from thermoplastic material. These can be produced, for example, by extrusion blow molding, rotational sintering, injection molding or deep-drawing. In any case, operating fluid containers of this type are provided with an extremely wide variety of installation parts, depending on the functionality. Containers of this type usually additionally have at least one filler opening and one or more ventilation openings. In any case, the ventilation of the operating fluid container is necessary during the filling, and possibly also permanently. A distinction is usually made between what is termed the refueling ventilation and the operational ventilation. During the filling of the operating fluid container, the gas volume displaced by the filling volumetric flow has to be discharged. To this end, it is necessary to provide ventilation points connected to ventilation lines at one or more locations of the operating fluid container.

Ventilation lines can be arranged both within the operating fluid container and outside the operating fluid container, and are usually routed to a single ventilation connection on the motor vehicle, which if appropriate represents the interface with the atmosphere. In the case of a fuel container, what is termed the refueling ventilation line is usually routed to the filler head of a filler tube.

If the operating fluid container is configured as a urea container, the refueling ventilation line can be routed both to a filler head and to a ventilation opening in a wheel house of the motor vehicle.

In principle, the installation of ventilation lines within the operating fluid container is relatively complicated and associated with high production costs.

Lines installed outside the operating fluid container have to be fastened to the container in such a way that they do not rattle and take up as little installation space as possible. In addition, these lines have to be fastened detachably to the operating fluid container, such that the operating fluid container can easily be exchanged in the case of servicing. To this end, it is necessary to provide quick-release fasteners in the lines, but this is relatively costly.

In the case of many small-volume operating fluid containers, there is the fundamental wish to attach ventilation lines to the outer side of the container and to provide the fewest possible ventilation points on the operating fluid container.

If only a single ventilation connection is to be provided on the operating fluid container, it is expedient to arrange said ventilation connection approximately in the centroid of the area of a top of an operating fluid container, but, depending on the installation situation in the motor vehicle, this requires a relatively complicated installation of the lines on the outer wall of the container.

The invention is therefore based on the object of providing an operating fluid container which can be produced at relatively low cost and which is improved in particular in terms of the nature and the number of the refueling and/or operational ventilation lines to be provided.

The object is achieved by an operating fluid container having the features of claim 1. Advantageous configurations of the invention become apparent from the dependent claims.

According to one aspect of the present invention, provision is made of an operating fluid container for a motor vehicle made of thermoplastic material, which container is composed of two shells so as to form a substantially closed hollow body, wherein a first shell forms a top of the container and a second shell forms a bottom of the container, said operating fluid container comprising at least one line, which is formed as an integral component part of a container wall over at least a partial length, wherein the line is formed over said partial length as a channel running in the container wall, the channel has an open, trough-shaped cross-sectional profile which forms a part of the line cross section, and the channel is closed by at least one cover, which complements the trough-shaped cross-sectional profile so as to form a closed cross section.

As already mentioned in the introduction, for the purposes of the invention, an operating fluid container in terms of the invention is meant to be, for example, a fuel container, for example a wiper washing container for receiving windscreen cleaning fluid, or for example an additive container, for example for receiving a liquid additive, the selective catalytic exhaust-gas denitrogenization.

The operating fluid container according to the invention preferably consists of a thermoplastic material based on HDPE, wherein the container can have a container wall formed with one layer or else multiple layers.

The shells of the operating fluid container according to the invention may have been obtained, for example, by deep-drawing semifinished products made of thermoplastic material, by rotational sintering, by injection molding thermoplastic material, or else, for example, by laminating various plies of thermoplastic material.

The core concept of the invention is that of providing, in at least one shell, at least one portion, running over a container bottom or over a container top, of at least one trough-shaped recess, which is part of a channel integrally formed with the shell in question. The cross-sectional profile of a channel formed in this way may be open on the outer side, for example, and may have been closed from the outside by a cover.

Alternatively, however, the channel can also be formed as a trough or groove which is open on the inner side of the container and which is closed on the inner side of the container by a cover.

The channel can extend in the plane of the container bottom or of the container top. According to the invention, a multiplicity of channels integrally formed with the container wall can be provided.

By way of example, the channel can have a U-shaped or V-shaped cross-sectional profile or a cross-sectional profile shaped like a segment of a pitch circle.

The cover can likewise consist of thermoplastic material and, for example, can be welded to the container wall in such a way that the cover complements the channel so as to form a cross-sectional profile which is closed on all sides and sealed circumferentially.

Alternatively, the cover can be snap-fitted into the channel, for example can be latched in a form-fitting manner with the container wall, if appropriate with the interposition of a separate sealing means.

In an expedient variant of the operating fluid container according to the invention, the channel extends in the top of the container, since a ventilation of the operating fluid container according to the invention is expediently provided at the side thereof at the top in the installed position.

The operating fluid container according to the invention expediently comprises a container wall at the top in the installed position, which in the context of the present application is referred to as the top, and also a container wall at the bottom in the installed position, which in the context of the present invention is referred to as the bottom. The top and the bottom of the operating fluid container according to the invention preferably extend approximately parallel to one another; at the edge, the top and the bottom expediently each merge into an end-side enclosure wall. The top and the bottom of the container can each be formed in an inherently offset form, i.e. they have a topography which extends in a plurality of planes. In general, however, the top and the bottom of the operating fluid container each define a reference plane.

The terms "operating fluid container", on the one hand, and "container", on the other hand, are used synonymously for the purposes of this application.

In one variant of the operating fluid container according to the invention, it is provided that the channel extends from a first central connection point in the top of the container to a second connection point at an outer edge of the top, wherein the central connection point is arranged preferably approximately in a centroid of the area of the top. By way of example, the central connection point can be formed as a central ventilation connection of the operating fluid container. The arrangement of the connection point in the centroid of the area of the top has the advantage that optimum refueling ventilation or an operational ventilation line is possible even when the motor vehicle is in an inclined position.

The outer edge of the top can merge, for example, into a circumferential, lateral enclosure wall of the container, out of which a second connection point of the line can be routed, for example.

The second connection point can be formed, for example, as a connection fitting integrally formed on the shell in question.

The line is expediently a ventilation line of the container, preferably a refueling ventilation line, but the line can also be formed as a filling line or as a removal line.

Although reference is made above to one line, the invention is to be understood in such a way that the operating fluid container according to the invention can comprise a plurality of lines, which are each formed as an integral component part of a container wall.

The operating fluid container according to the invention is preferably formed from injection-molded half-shells, which have the advantage that connection nipples and connection fittings can be integrally molded on.

In an expedient variant of the operating fluid container according to the invention, it is provided that the lines extend between a filling ventilation valve or an operational ventilation valve and the second connection point.

Parts of the filling ventilation valve, of the operational ventilation valve or of a valve housing can be integrally formed, for example, on the cover of the channel.

In an advantageous embodiment of the operating fluid container according to the invention, it is provided that the container wall has thickened portions, which form an edge-side surround of the channel. These thickened portions are particularly advantageous as what is termed a welding allowance, when the cover is to be welded to the container wall.

In this context, welding is to be understood as meaning welding of the cover to the container wall by the mutual penetration or entanglement of the molecules of the materials to be welded, with the application of temperature and pressure. The cover can be welded to the container wall, for example, by hot plate welding, laser welding or else friction welding.

In an expedient variant of the operating fluid container, it is provided that the cover has an integrally formed valve housing receptacle. A valve housing for a refueling ventilation valve or an operational ventilation valve can be welded, latched or screwed or else adhesively bonded to the valve housing receptacle, for example.

The channel expediently issues into an opening in the container wall for receiving a valve housing. This opening can form the central connection point in the container top of the operating fluid container.

In a particularly preferred variant of the operating fluid container according to the invention, it is provided that the cover is formed from an electrically conductive thermoplastic material. This can be expedient, for example, if the line is formed as a filling line for a fuel container as the operating fluid container.

It can similarly be expedient for the line to be formed as a refueling ventilation line or operational ventilation line of an additive container. In this case, it is possible to utilize the property of the electrical conductivity of the material of the cover to realize electrical heatability of the cover. This can be advantageous in particular when the operating fluid container is formed as a container for receiving an aqueous additive for exhaust-gas denitrogenization. This can ensure, particularly in winter operation, that any additive condensed in the line does not freeze.

In principle, the cover can be formed as an electrical heating element, it also being possible, for example, for the heating function to be ensured by virtue of the fact that electrically conductive elements are embedded in the plastic of the cover, with it then being possible for an electrical voltage to be applied to the electrically conductive elements. The heatability of the cover can alternatively be ensured by virtue of the fact that one or more PTC elements are integrated in the cover, or that the cover is formed as a PTC element.

Alternatively, the cover can have closed channels which can be exposed to a heat-exchanger medium, for example to cooling fluid from the cooling circuit of the internal combustion engine. In this case, the cover itself is formed as a heat exchanger which can be exposed to the flow of a medium.

Furthermore, the cover can have integrally formed baffle elements as a droplet separator. These baffle elements can bring about a labyrinth-like subdivision of the line, on which any droplets which may be entrained during the refueling ventilation can be deposited.

By way of example, the cover can also have at least one integrally formed connection fitting.

BRIEF DESCRIPTION OF THE DRAWINGS

The invention will be explained hereinbelow on the basis of an exemplary embodiment shown in the drawings, in which.

DETAILED DESCRIPTION OF THE EMBODIMENTS

Figure 1:
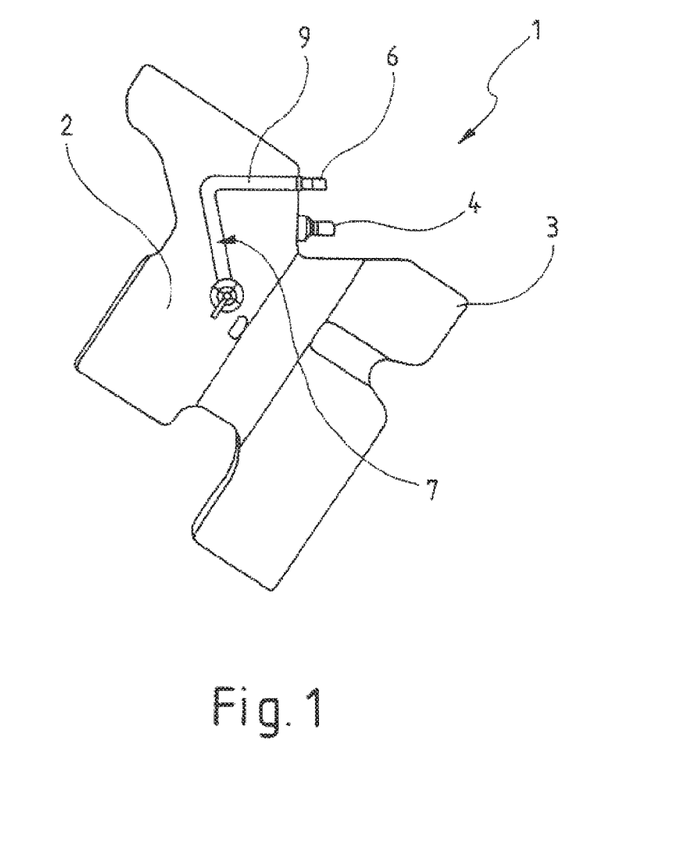
FIG. 1 shows a plan view of an operating fluid container according to the invention.

Reference is made firstly to FIG. 1, which shows a plan view of the top 2 of the operating fluid container 1 according to the invention. The operating fluid container 1 according to the exemplary embodiment consists of two shells made of thermoplastic material, specifically an upper shell and a lower shell, of which only the upper shell 3 which forms a top 2 is visible in the drawings. Just like the lower shell (not shown), the upper shell 3 has preferably been produced by injection molding thermoplastic material. The upper shell 3 and the lower shell are welded to one another at the edge so as to form the closed operating fluid container 1.

The operating fluid container 1 can comprise functional installation parts in the volume enclosed by the operating fluid container 1. These are not discussed in further detail hereinbelow.

Figure 2:
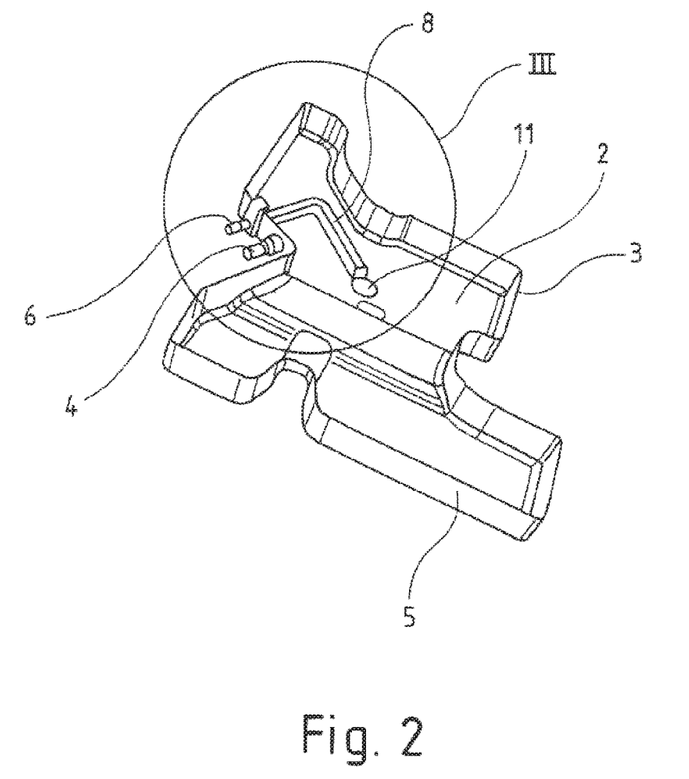
FIG. 2 shows a perspective bottom view of a top of the operating fluid container according to the invention.

As is visible from FIG. 1 and FIG. 2, the upper shell 3 of the operating fluid container 1 comprises an integrally formed first connection fitting 4, which forms a filler opening of the operating fluid container 1. The first connection fitting 4 is formed on an enclosure wall 5 of the upper shell 3. A second connection fitting 6, provided in addition to the first connection fitting 4, forms a ventilation connection to a ventilation line 7 of the operating fluid container 1. The ventilation line 7 is provided as a line in the sense of the invention, which is formed as an integral component part of the container wall of the operating fluid container 1.

Figure 3:
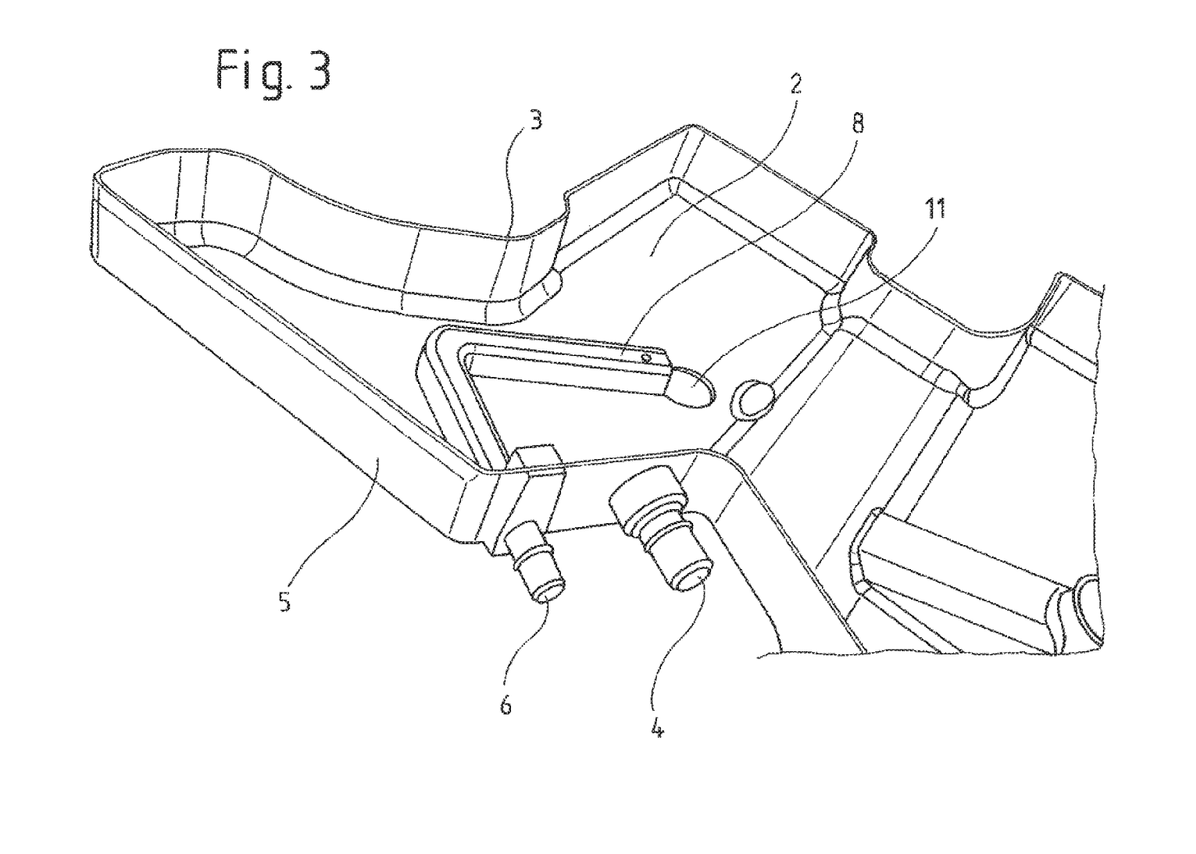
FIG. 3 shows an enlarged view of section III shown in FIG. 2.
Figure 4:
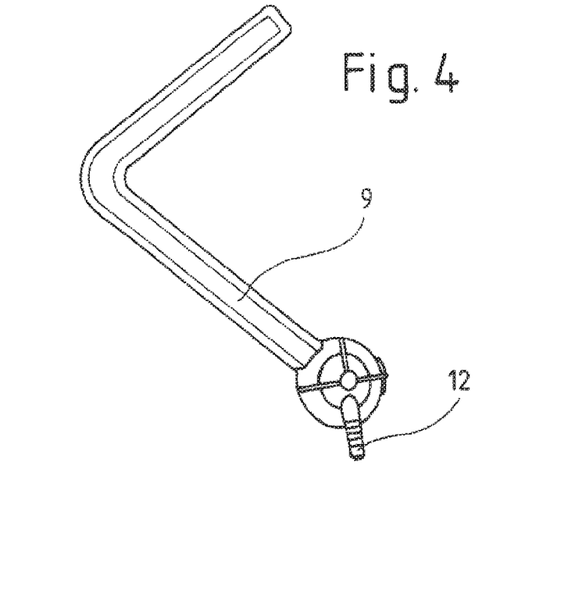
FIG. 4 shows a view of the cover of the channel, wherein the figure shows the visible outer side of the cover.

As can be gathered in particular from FIG. 2 and FIG. 3, the ventilation line 7 is formed by a channel 8 running in the container wall of the top 2 and integrally formed with the container wall, wherein the channel 8 has a groove-shaped or U-shaped, outwardly open, trough-shaped cross-sectional profile. The channel 8 is covered to the outside by the cover 9 shown in FIG. 4 and FIG. 5, wherein the cover is welded to the container wall of the upper shell 3 from the outside. The cover 9 is formed in a manner so as to follow the curved progression of the channel 8 in the top 2 of the operating fluid container 1 and is provided at one end with a receptacle 10 for a valve housing.

The cover 9 brings about complete circumferential sealing of the channel 8. FIG. 2 and FIG. 3 show an inner view of the upper shell 3 without the cover 9 closing the channel 8. The channel 8 extends from the second connection fitting 6 to an opening 11, which is provided centrally in the top 2 and is formed as a circular cutout of the container wall of the upper shell 3.

Figure 5:
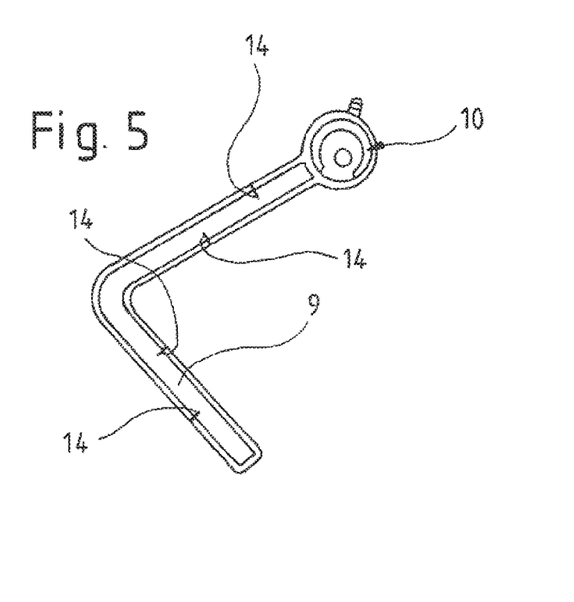
FIG. 5 shows an illustration of the bottom side of the cover shown in FIG. 4.

Reference sign 14 in FIG. 5 denotes baffle elements, which are formed on the cover 9 and which act as a droplet separator, since they form a labyrinth in the channel 8.

The opening 11 forms the first central connection point in the top 2 of the container, whereas the second connection fitting 6 defines the second connection point on the outer edge of the top 2.

A valve housing inserted into the receptacle 10 of the cover 9 is introduced into the opening 11 from the outside, to be precise in such a manner that the channel 8 can issue into the valve housing.

The cover 9 closes the opening 11 and also the channel 8 at the edge, wherein the cover may have been welded onto the container wall of the top 2 or of the upper shell 3.

The closed configuration of the channel 8 with the cover 9 welded to the upper shell 3 is shown in FIG. 1.

In the exemplary embodiment shown, the receptacle 10 at the cover 9 defines an operational ventilation path separate from the refueling ventilation path. To this end, a third connection fitting 12 is provided on the cover 9 and has a fir-tree profile onto which a hose line can be positioned.

A filler tube or a filler hose can be positioned onto the first connection fitting 4, wherein the filler tube or the filler hose can be routed to a filler head (not shown) with a correspondingly formed orifice connector for receiving a refilling nozzle. A ventilation line installed outside the operating fluid container 1 and routed to said filler head can be connected to the second connection fitting 6.

Figure 6:
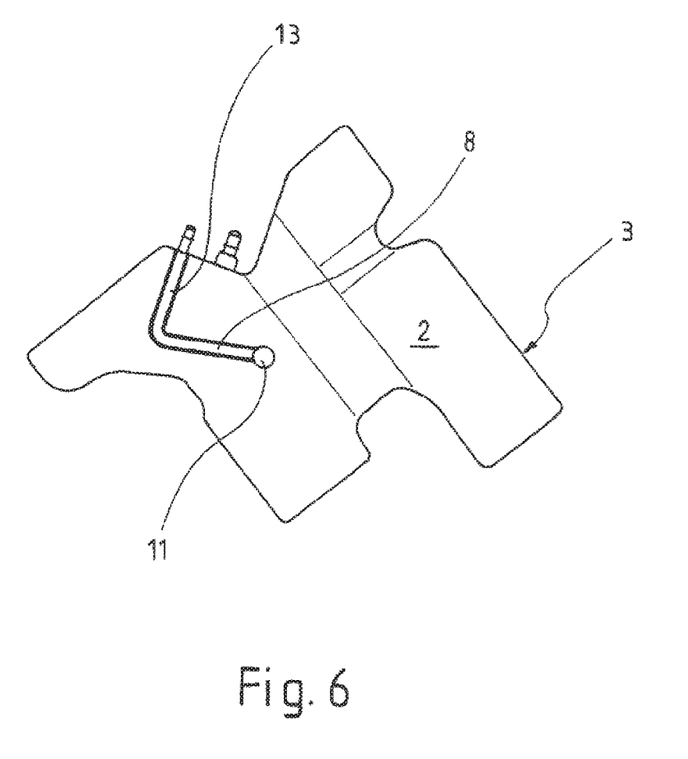
FIG. 6 shows a plan view of the operating fluid container without a cover.

FIG. 6 shows the top 2 of the operating fluid container 1 without the cover 9. As is shown as an indication in the figure, the channel 8 is encompassed at the edge by a thickened portion 13, which serves as a welding allowance for the purpose of welding on the cover 9.

| List of reference signs | |
|---|---|
| 1 | Operating fluid container |
| 2 | Top |
| 3 | Upper shell |
| 4 | First connection fitting |
| 5 | Enclosure wall |
| 6 | Second connection fitting |
| 7 | Ventilation line |
| 8 | Channel |
| 9 | Cover |
| 10 | Receptacle |
| 11 | Opening |
| 12 | Third connection fitting |
| 13 | Thickened portion |
| 14 | Baffle elements |

The invention claimed is:

1. An operating fluid container for a motor vehicle, made of thermoplastic material, comprising:

two shells that form a substantially closed hollow body, wherein a first shell forms a top of the container and a second shell forms a bottom of the container, at least one line formed as an integral component part of a container wall over at least a partial length, wherein the line is formed as a channel in the container wall, wherein the channel has an open, trough-shaped profile in cross section, and extends from a first connection point in the top of the container to a second connection point at an outer edge of the top, wherein the first connection point is arranged preferably approximately in a centroid of an area of the top, and at least one cover that closes the channel, wherein the cover complements the trough-shaped profile.

2. The operating fluid container as claimed in claim 1, wherein the cover is welded to the container wall.

3. The operating fluid container as claimed in claim 1, wherein the channel extends in the top of the container.

4. The operating fluid container as claimed in claim 1, wherein the second connection point is a connection fitting integrally formed on the top.

5. The operating fluid container as claimed in claim 1, wherein the line is a ventilation line of the container.

6. The operating fluid container as claimed in claim 1, wherein the line extends between a filling ventilation valve and the second connection point.

7. The operating fluid container as claimed in claim 2, wherein the container wall has thickened portions, which form an edge-side surround of the channel.

8. The operating fluid container as claimed in claim 1, wherein the cover has an integrally formed valve housing receptacle.

9. The operating fluid container as claimed in claim 1, wherein the cover is formed from an electrically conductive thermoplastic material.

10. The operating fluid container as claimed in claim 1, wherein the cover is an electrical heating element.

11. The operating fluid container as claimed in claim 1, wherein the cover has integrally formed baffle elements as a droplet separator.

12. The operating fluid container as claimed in claim 1, wherein the cover has at least one integrally formed connection fitting.

13. The operating fluid container as claimed in claim 1, wherein the cover comprises an electrical heating element.

* * * * *